United States Patent
Guidati et al.

(10) Patent No.: US 8,327,647 B2
(45) Date of Patent: Dec. 11, 2012

(54) LOW CARBON EMISSIONS COMBINED CYCLE POWER PLANT AND PROCESS

(75) Inventors: Gianfranco Guidati, Zürich (CH); Camille Pedretti, Wettingen (CH)

(73) Assignee: ALSTOM Technology Ltd., Baden (CH)

( * ) Notice: Subject to any disclaimer, the term of this patent is extended or adjusted under 35 U.S.C. 154(b) by 100 days.

(21) Appl. No.: 12/848,311

(22) Filed: Aug. 2, 2010

(65) Prior Publication Data

US 2010/0319354 A1   Dec. 23, 2010

Related U.S. Application Data

(63) Continuation of application No. PCT/EP2009/050727, filed on Jan. 22, 2009.

(30) Foreign Application Priority Data

Feb. 4, 2008   (EP) ..................................... 08101260

(51) Int. Cl.
*F02C 3/34* (2006.01)
*F02C 6/00* (2006.01)
*F01K 23/10* (2006.01)
*F25J 3/06* (2006.01)

(52) U.S. Cl. ........ 60/772; 60/39.182; 60/39.5; 60/39.52
(58) Field of Classification Search .................... 60/772, 60/773, 39.182, 39.5, 39.52
See application file for complete search history.

(56) References Cited

U.S. PATENT DOCUMENTS

| | | | |
|---|---|---|---|
| 6,637,183 B2* | 10/2003 | Viteri et al. | 60/39.52 |
| 7,966,829 B2* | 6/2011 | Finkenrath et al. | 60/39.52 |
| 7,985,278 B2* | 7/2011 | Guidati et al. | 95/39 |
| 2004/0060296 A1 | 4/2004 | Koganezawa et al. | |
| 2007/0034171 A1 | 2/2007 | Griffin et al. | |
| 2008/0083226 A1* | 4/2008 | Joshi et al. | 60/772 |

FOREIGN PATENT DOCUMENTS

| | | | |
|---|---|---|---|
| FR | 2894838 | | 6/2007 |
| WO | WO 99/01194 | * | 1/1999 |
| WO | WO03/029739 | | 4/2003 |
| WO | WO2008/017577 | | 2/2008 |
| WO | WO2009/098128 | | 8/2009 |

OTHER PUBLICATIONS

Search Report for European Patent App. No. 08101260.1 (Dec. 1, 2008).
International Search Report for PCT Patent App. No. PCT/EP2009/050727 (May 11, 2009).

* cited by examiner

*Primary Examiner* — Ted Kim
(74) *Attorney, Agent, or Firm* — Cermak Nakajima LLP; Adam J. Cermak

(57) ABSTRACT

A low carbon emissions, combined cycle power plant utilizes vortex nozzles (38) operative at cryogenic temperatures to separate out carbon dioxide (39) from the flue gases. Complexity of the plant is minimized by operating a gas turbine engine component (10) of the plant at a turbine exhaust pressure of at least 2 bar, so that downstream components of the plant, including a heat recovery steam generator (19A), a gas cooling system (30, 33, 36), and the inlets of the vortex nozzles, all operate at the same pressure of at least two bar. To increase carbon dioxide concentration in the flue gases (37) that pass through the vortex nozzles (38), and thereby increase efficiency of carbon dioxide removal from the flue gases, up to 50% of the flue gases that exit the heat recovery steam generator (19A) may be recirculated to a location (L, FIG. 4)) in the compressor of the gas turbine engine where the pressure of the compressor air matches the flue gas pressure.

31 Claims, 3 Drawing Sheets

LOW CARBON EMISSIONS COMBINED CYCLE POWER PLANT AND PROCESS

This application is a Continuation of, and claims priority under 35 U.S.C. §120 to, International application number PCT/EP2009/050727, filed 22 Jan. 2009, and claims priority under 35 U.S.C. §119 therethrough to European application number 08101260.1, filed 4 Feb. 2008, the entireties of which are incorporated by reference herein.

BACKGROUND

1. Field of Endeavor

The present invention relates to the field of climate protection technology, and in particular to reduced complexity and increased efficiency of carbon capture in combined cycle power plants, in which waste heat from a gas turbine engine is used to raise steam for a steam turbine.

2. Brief Description of the Related Art

Devices for production and separation of carbon dioxide ($CO_2$) from gas streams, using cryogenic separation units in the form of vortex nozzles (also called cyclonic separators), are known from prior published patent applications WO-A2-03/029739 and US-A1-2003/0145724. To operate efficiently at ambient temperatures, such vortex nozzles require to be fed by cooled gas streams pressurized to at least 2 or 3 bar at the inlets to the vortex nozzles. Within the vortex nozzles, the gases expand rapidly to much lower pressures, rapidly cooling the gas. A prior International patent application PCT/EP2007/057434, filed 7 Aug. 2006, uses vortex nozzles in an improved process for separating $CO_2$ from a gas flow, such as the exhaust from a gas turbine engine burning a fossil fuel. In general terms, the process includes: compressing the gas flow to a pressure of about 2-3 bar, cooling it down to about −40° C. to −50° C., supersonically expanding it through vortex nozzles so that solid $CO_2$ centrifugally precipitates from the rest of the gas flow, and discharging the $CO_2$ from the outer wall of the vortex nozzle for further treatment, such as preparation for sequestration.

FIG. 1 diagrammatically illustrates a known type of sequential arrangement of plant components for a $CO_2$ capture process specifically adapted for use in conjunction with a combined cycle power plant. A gas turbine engine 10 compresses intake air 11 in a compressor 12, burns fuel in the compressed air 13 in a combustor 14, and obtains work from the combustion gases 15 in a turbine 16, which drives the compressor 12 via a common shaft 17. The major part of the mechanical power developed in turbine 16 is used to drive the electrical generator G. After expansion through the turbine 16, the exhaust gases 18 are typically at about atmospheric pressure and contain about 3-4 volume % $CO_2$. The hot exhaust or flue gases 18 exit from the exhaust duct of turbine 16 and are passed through a heat recovery steam generator (HRSG) 19 which raises steam 20 for expansion through a steam turbine 21 to generate further power from a generator G, driven through a shaft on which steam turbine 21 is mounted. After exit from the steam turbine 21, the wet steam 22 is passed through a condenser 23, and the condensed water 24 is then recycled to the HRSG 19 by pump P. After giving up much of their heat in the HRSG 19, the flue gases 25 remain at about atmospheric pressure, but have been reduced to a temperature of about 80-120° C. Gases 25 are then cooled down to approximately ambient temperature (typically the temperature of available cooling water+10 K) in a heat exchanger 26. The cooling water used in the heat exchanger 26 may, for example, be re-cooled in one or more cooling towers, or environmental water from a river, lake or sea, could be used to cool the flue gases 25.

As previously mentioned, carbon dioxide separation in a vortex nozzle requires the gases to be pressurized in the range 2 to 3 bars, at least. The cooled flue gas 27 is therefore compressed in a gas compressor 28, driven by a motor M1, which may be powered by electricity generated by the gas turbine 10 and the steam turbine 21. Alternatively, the gas compressor 28 maybe directly coupled to the shafts of either the gas or the steam turbine. The compressed flue gases 29 must then be cooled down to a temperature of −40 to −50° C. before the $CO_2$ can be cryogenically separated in a set of vortex nozzles 38 whose inlets are arranged to receive flue gases in parallel with each other (only one nozzle is shown). This is achieved by a flue gas cooling system operating in a three-stage process. In the first cooling stage, the compressed flue gas is cooled back down towards ambient temperature (again, typically the temperature of available cooling water+10 K) in a suitable heat exchange arrangement 30. The second and third stages comprise active cooling cycles or other refrigeration apparatus. In the present example heat pumps are used, these being generally indicated by numerals 33 and 36. As known, each heat pump 33/36 includes an evaporator 331/361, a compressor 332/362 driven by a motor M2, a condenser 333/363, and a metering valve 334/364. Hence, in the second cooling stage, flue gas 31 from the first cooling stage passes through the evaporator 331 of active cooling cycle 33. Flue gas 34 leaves evaporator 331 at a temperature which is 2 to 5 K above the freezing point of water, the evaporator being equipped with a suitable known device for separating condensed water from the flue gas. In the third cooling stage, flue gas 34 from the second stage is further cooled down to the required temperature of −40° C. to −50° C. by an evaporator 361 of the second active cooling cycle 36. Evaporator 361 must be equipped with a suitable device for removing ice deposited on the heat exchanger surfaces during cooling of the flue gas. Finally, compressed cooled flue gas 37 enters the vortex nozzles 38, where it is cooled by expansion and centrifugally separated into a $CO_2$ stream 39 and a residual flue gas stream 43. The $CO_2$ stream 39 is cleaned, compressed by gas compressor 40 and fed into a pipeline 41 for storage, while the residual flue gas 44 is discharged into the atmosphere through a flue, stack (S), or the like, after undergoing further environmental cleaning procedures, if necessary.

To increase system efficiency, the condenser 363 for refrigerant in the second active cooling cycle is placed downstream of the vortex nozzles 38 so that the cold, $CO_2$-depleted flue gas 43 exhausted from the vortex nozzle 38 can be used as a heat sink.

The $CO_2$ capture/separation process will not be further described here because it is adequately described in the above-mentioned prior patent application and other prior art.

Without the provision of $CO_2$ capture equipment in FIG. 1, the flue gas would simply be ejected to atmosphere after leaving the HRSG 19. However, to obtain the cool pressurized flue gas required for feeding into the vortex nozzle 38, a compressor 28 and the cooling units 26, 30, 331, and 361 are required, resulting in plant complexity and costs in construction, running and maintenance.

SUMMARY

According to one of numerous aspects of the present invention, a low carbon emissions combined cycle power plant utilizes vortex nozzles to separate out carbon dioxide from flue gases at cryogenic temperatures, and the plant's complexity is minimized, by operating a gas turbine engine part of the plant with a turbine exhaust pressure and pressure of the downstream parts of the plant located between the gas turbine engine and the vortex nozzles at a pressure, which is high enough to assure an inlet pressure to the vortex nozzle of at least 2 bar. In consequence the turbine exhaust pressure is the required inlet pressure of the vortex nozzle plus the pressure losses of all components and duct between the turbine exit and the inlet of the vortex nozzle.

Such downstream parts of the plant preferably include a heat recovery steam generator (HRSG) and a gas cooling system. The gas cooling system preferably includes a heat exchange arrangement operable to cool flue gases received from the HRSG down to a temperature approximating normal ambient temperature and active cooling apparatus operable to further cool the flue gases down to a temperature range of roughly −40° C. to −50° C.

In more detail, a low carbon emissions combined cycle power plant embodying principles of the present invention includes:

a gas turbine engine fuelled by carbon-containing fuel and operable to exhaust carbon dioxide-containing flue gases from a turbine exhaust duct;

a heat recovery steam generator (HRSG) operable to raise steam by cooling flue gases received from the turbine exhaust duct;

a steam turbine operable to produce shaft power from steam received from the HRSG;

a heat exchanger arrangement operable to cool flue gases received from the HRSG down to a temperature approximating normal ambient temperature;

active cooling apparatus operable to further cool the flue gases down to a temperature range of roughly −40° C. to −50° C.; and a plurality of vortex nozzles, each vortex nozzle having an inlet to receive flue gases from the active cooling apparatus and being operable to separate out carbon dioxide cryogenically from the received flue gases and to emit carbon-dioxide-depleted flue gases;

wherein, in use, the gas turbine engine exhaust duct, the HRSG, the heat exchanger arrangement, and the active cooling apparatus operate at a pressure which is high enough to assure entry of the flue gases to the vortex nozzles to operate at a pressure of at least roughly 2 bar, preferably at a pressure in the range of roughly 2 to 4 bar.

Preferably, the plant further comprises:

a gas compressor operable to compress separated carbon dioxide received from the vortex nozzles and pass it to a pipeline for conveyance to storage; and a flue gas discharge stack or the like to receive the carbon-dioxide-depleted flue gases and discharge them to atmosphere, optionally after removal of further pollutants from the flue gases.

In a plant of this sort, several to many vortex nozzles will be arranged in parallel with each other to process the gases received from the active cooling apparatus.

To increase the percentage of carbon dioxide in the exhaust gases of the gas turbine engine, and thereby make the carbon dioxide removal process more efficient, the plant may be provided with a flow diverter located between the HRSG and the heat exchange arrangement and operative to recirculate a proportion (e.g., 10%, 20%, 30%, 40% or up to 50%) of the gases that pass through the HRSG by injecting them into a compressor of the gas turbine engine (GT compressor) at a location whose pressure is substantially the same as the pressure of the recirculated gases.

The plant may be adapted by the designer to inject the recirculated gases into the GT compressor at a desired temperature chosen in accordance with the thermodynamic cycle it is desired to adopt. Thus, to minimize mixing losses in the GT compressor, the temperatures of the recirculated injected gases and the GT compressor air at the injection location should be substantially the same as each other. Alternatively, if the recirculated gases are injected into the GT compressor at a substantially lower temperature than the temperature of the GT compressor air at the injection location L, thermodynamic cycle improvements can be achieved analogous to those attributable to compressor intercooling. Such cooling of the recirculated flue gases could provide increased engine power output and cycle thermal efficiency without exceeding the temperature limits of the GT compressor and combustor.

It would be possible to adapt the design of the HRSG so that it is capable of cooling the flue gases all the way down to the desired temperature for injection into the GT compressor. Alternatively, the HRSG could cool the flue gases part of the way down to the desired temperature and a gas cooler between the flow diverter and the GT compressor could cool the gases the remainder of the way down to the desired temperature.

In one embodiment, the HRSG incorporates a flow diverter so that a desired proportion of the flue gases are diverted to the GT compressor before the gases have passed completely through the HRSG. If the part of the HRSG between its inlet and the flow diverter is not capable of cooling the flue gases all the way down to a desired temperature for injection of the flue gases to the GT compressor, there could be a gas cooler between the flow diverter in the HRSG and the GT compressor to further cool the diverted flue gases to the desired temperature.

The gas turbine engine used in the plant may be a modified version of a pre-existing engine having a plurality of turbine stages and operative with a pressure in the turbine exhaust duct of approximately 1 bar, the modified version having at least one turbine stage less than the pre-existing engine, whereby the modified version is operative with a pressure in the turbine exhaust that is the above-mentioned required inlet pressure of the vortex nozzle plus the pressure losses of the downstream parts of the plant located between the gas turbine engine and the vortex nozzles.

Another aspect of the present invention embraces a process for obtaining low carbon emissions from a combined cycle power plant that includes a gas turbine engine fuelled by carbon-containing fuel such that the engine exhausts carbon dioxide-containing flue gases, the process further comprising:

a first cooling step in which the flue gases are cooled by using them to raise steam to drive a steam turbine to produce shaft power;

a second cooling step in which the flue gases are further cooled to a temperature approximating normal ambient temperature;

a third cooling step in which the flue gases are further cooled to a temperature range of approximately −40° C. to −50° C.;

a cryogenic separation step comprising separating carbon dioxide from the flue gases and emitting carbon dioxide depleted flue gases;

wherein exhaustion of the flue gases from the gas turbine engine and cooling of the flue gases occurs at a pressure which is high enough to assure entry to the cryogenic separation step of at least roughly 2 bar.

Further aspects of the invention will be apparent from a perusal of the following description.

BRIEF DESCRIPTION OF THE DRAWINGS

Exemplary embodiments of the invention will now be described, with reference to the accompanying drawings, in which.

DETAILED DESCRIPTION OF EXEMPLARY EMBODIMENTS

Figure 1:
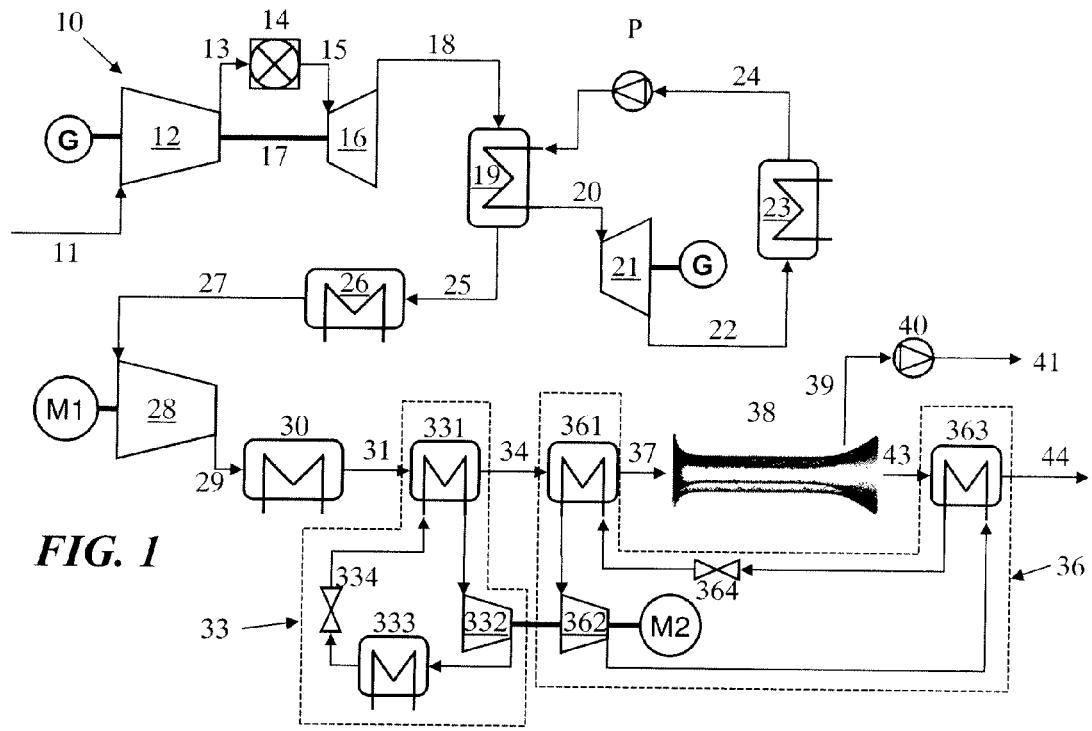
FIG. 1 is a flow diagram illustrating a known type of combined cycle plant with an added $CO_2$ capture facility.

In FIGS. 1 to 4, plant components and fluid flows which are the same or closely similar in different Figures have been given the same reference numerals and will not be described again if they have been described for an earlier Figure.

Figure 2:
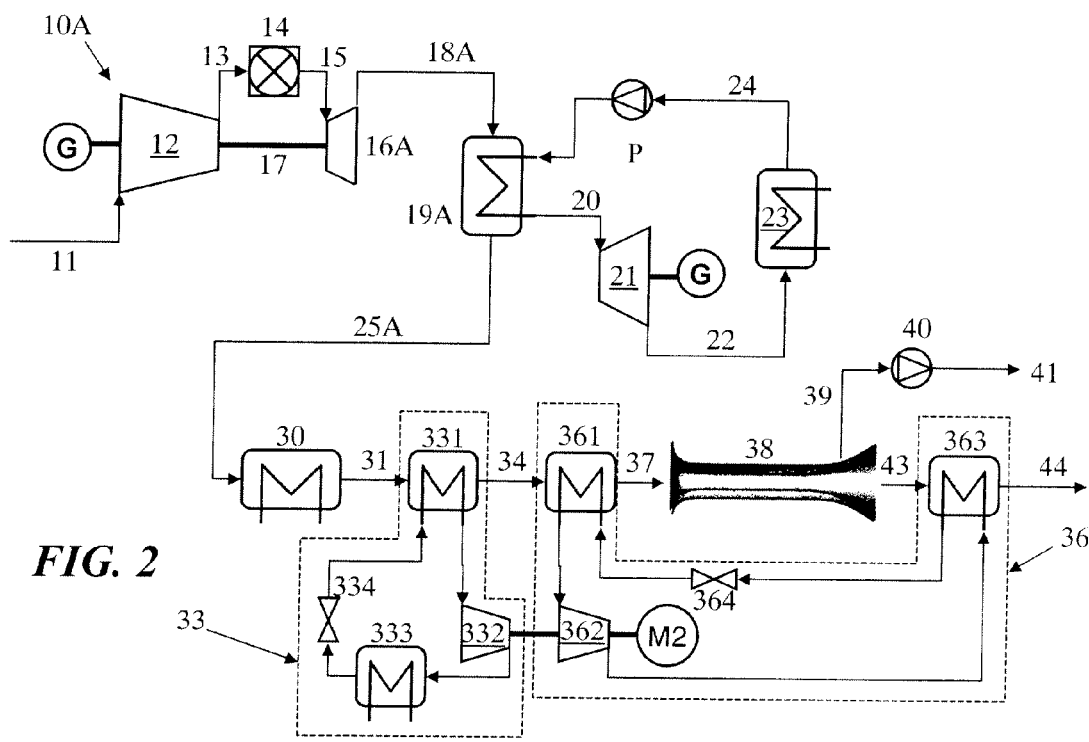
FIG. 2 is a flow diagram illustrating a simplified version of the plant of FIG. 1 according to a first embodiment of the invention.

Referring to FIG. 2 and comparing it with FIG. 1, it will be seen that the complexity of the plant has been reduced by omitting the gas cooler 26 and the compressor 28. This simplification is enabled by increasing the exhaust pressure of the turbine 16A of gas turbine engine 10A, compared with the original turbine 16 of gas turbine engine 10. Practically, this can be achieved by removing at least the last stage of the turbine 16. The number of turbine stages removed from turbine 16, to achieve the modified turbine 16A, will depending on the type of existing engine being considered for use in conjunction with embodiments adhering to principles of the present invention, but is likely to be one or two, and unlikely to be more than three stages.

As an alternative to the modification of an existing gas turbine engine, it would of course be possible to create a new design of engine capable of giving a desired increase in exhaust pressure. In a modified design or a new design, a benefit may arise from turbine 16A having fewer turbine stages than is normal for a gas turbine engine in a combined cycle power plant, in that it may allow turbine 16A to be designed for increased mass flow and power. This possibility arises because the greater length and weight of the turbine rotor blades in the final stages of the turbine 16 causes the blades and the rotors on which they are mounted to be the most highly stressed components in the turbine. They are therefore limiting factors in terms of the turbine's mechanical integrity.

Assuming that turbine 16A of FIG. 2 has between one and three fewer stages than turbine 16 of FIG. 1, the pressure of the flue gas will still be in the range 2 to 4 bar at the exit of the HRSG 19A, thereby enabling omission of a compressor from the subsequent process of FIG. 2.

Note that an increase in turbine exhaust temperature will accompany the increased turbine exhaust pressure. Consequently, in comparison with the HRSG 19 of FIG. 1, the HRSG 19A of FIG. 2 must be constructed to withstand the higher pressure and temperature of the flue gases 18A issuing from the turbine exhaust. Because HRSG 19A will operate at increased temperature and pressure compared to HRSG 19, it will have an increased heat flow rate and may have a better heat exchange efficiency. Nevertheless, to enable elimination of the gas cooler 26 (FIG. 1), it may be necessary to provide HRSG 19A with a significantly larger heat exchange area than HRSG 19. Whatever the construction of HRSG 19A, heat exchanger 30 should be constructed to be capable of cooling the flue gas 25A that exits from HRSG 19A to approximately ambient temperature (typically the temperature of available cooling water+10 K).

The subsequent stages of the process in FIG. 2 are the same or closely similar to the process outlined in FIG. 1, and will therefore not be further described.

The power output of the FIG. 2 embodiment will be closely comparable with the net power output of the FIG. 1 plant, but with a substantially simpler plant arrangement.

Although FIGS. 2 to 4C indicate only one vortex nozzle 38, there will in fact be an array of vortex nozzles receiving the flue gases in parallel with each other.

Figure 3:
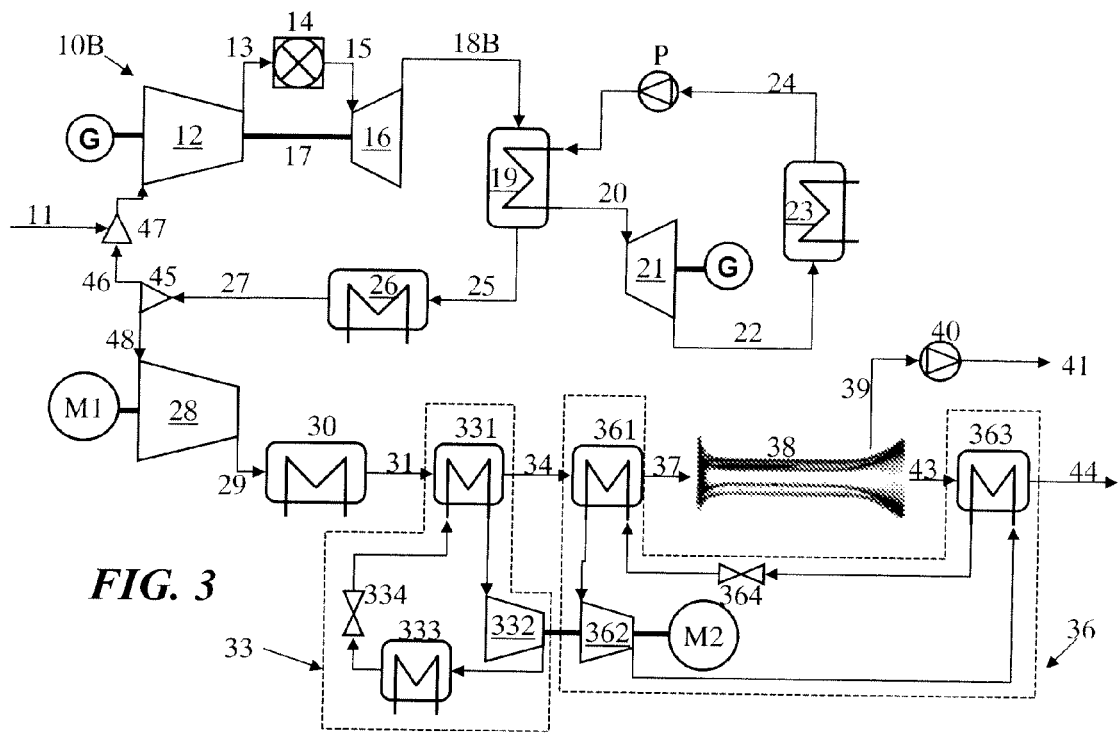
FIG. 3 is a flow diagram illustrating a known type of combined cycle plant with flue gas recirculation and an added $CO_2$ capture facility.

FIG. 3 diagrammatically illustrates a known type of sequential arrangement of plant components for a $CO_2$ capture process specifically adapted for use in conjunction with a combined cycle power plant having exhaust gas recirculation. It includes a modified form of the plant in FIG. 1, in which it is assumed that the following plant parameters are the same in both FIG. 1 and FIG. 3:

the mass flow rate through the turbine 16;
the shaft power generated by the gas turbine engine 10 and the steam turbine 21;
the flue gas pressures and temperatures at the entry and exit of the HRSG 19 and the gas cooler 26, and their heat flow rates; and
the heat energy recovered from the flue gases by the HRSG 19.

As in FIG. 1, the flue gas 25 that exits the HRSG 19 in FIG. 3 is further cooled in the gas cooler 26. After gas cooler 26, the flue gas 27 is at or near ambient pressure and temperature (i.e., the temperature of the available cooling water+10 K). At this point, it is split into two streams by a diverter 45, one stream 46 being returned to the inlet of the compressor 12 of the gas turbine engine 10 and the other stream 48 being forwarded to the gas compressor 28 and the cooling units 30, 331, 361 in preparation for entry to the vortex nozzles 38. Before entry to the compressor 12, the recirculated flue gas stream 46 is mixed with a stream of ambient air 11A in a gas mixer 47. It is assumed here that about 50% of the flue gas 27 is recirculated, though lesser proportions of flue gas recirculation, e.g., in the range 10% to 50%, would also be worthwhile.

A purpose of exhaust gas recirculation is to increase the $CO_2$ concentration in the turbine exhaust gas 18B, thus facilitating more efficient separation of the $CO_2$ in the vortex nozzles 38. In comparison with FIG. 1, the arrangement of FIG. 3, assuming 50% recirculation, increases the $CO_2$ content of the flue gases from about 3 to 4 vol. % to about 6 to 8 vol. %. Of course, if lower proportions of the flue gases are recirculated, their $CO_2$ content will be correspondingly reduced.

Again assuming 50% recirculation, the mass flow rate of the non-recirculated flue gas stream 48 in FIG. 3 will be only half that of flue gas stream 27 in FIG. 1, meaning that the compressor 28 will impose only half the power drain on the plant compared with compressor 28 in FIG. 1. Furthermore, the power that is required to run the active cooling cycles 33 and 36 is also reduced to one half. Proportions of recirculated flue gases 46 that are less than 50% will of course result in lower power savings in compressor 28 and active cooling cycles 33 and 36.

Figure 4A:
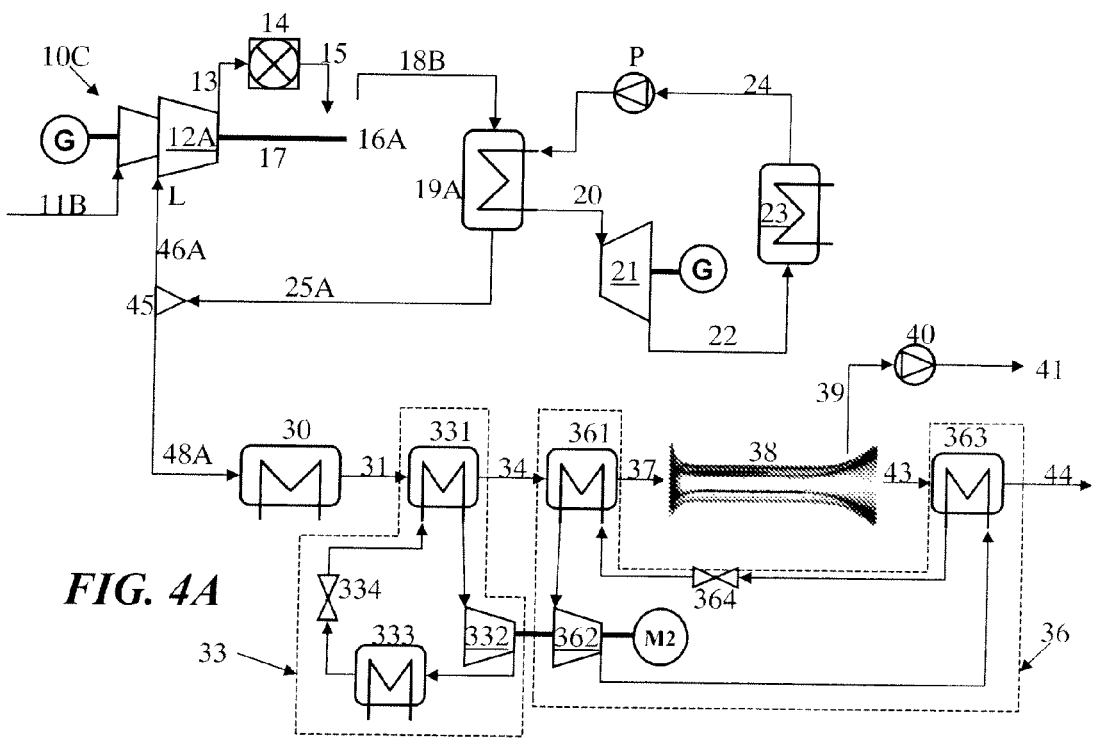
FIGS. 4A to 4C are flow diagrams illustrating simplified versions of the plant of FIG. 3 according to second, third and fourth embodiments of the invention.

In FIG. 4A, a simpler process is proposed. In comparison with FIG. 3, compressor 28, cooler 26, and gas mixer 47 are eliminated by increasing the pressure of the gas turbine exhaust gas 18B and the cooling ability of the HRSG 19A. As was the case for the embodiment of FIG. 2, increased exhaust pressure is achieved by removing at least the final stage of the turbine 16 of FIG. 3, resulting in the benefits already mentioned for the turbine 16A. As was the case for FIG. 2, it is assumed that the exhaust gas pressure is increased to between 2 to 4 bar, with corresponding increase in temperature, and corresponding changes to the construction of HRSG 19A.

The skilled person will appreciate that in exhaust gas recirculation processes, the recirculated gas should be injected into the gas turbine engine's compressor at a location where the pressure of the recirculated gas is substantially the same as the pressure in the compressor. Hence, in FIG. 3, after mixing with ambient air at atmospheric pressure, the recirculated gases 46 are injected into the intake of the compressor 12, but in FIG. 4A, recirculated gases 46A are injected at an interstage location L part-way through the compressor.

Note that the temperature of the recirculated gases when injected into the compressor of the gas turbine engine will depend on the thermodynamic cycle adopted by the designer.

In a first possible cycle, it is arranged that the temperature of the recirculated flue gases 46A substantially matches the compressor air temperature at the injection location L. This strategy minimises mixing losses in the compressor.

In a second possible cycle, it is arranged that the recirculated gases 46A are injected into the compressor 12A at a substantially lower temperature than the temperature of the compressor air at the injection location L. This strategy achieves thermodynamic cycle improvements in a manner analogous to that achieved by compressor intercooling, i.e., it provides increased engine output power and thermal efficiency without exceeding the temperature limits of the engine's compressor and combustor.

At least in the first of the above suggested thermodynamic cycles, and perhaps also in the second, the required temperatures of the recirculated flue gases could be achieved by appropriate construction (e.g., amount of heat exchange area) of the HRSG 19A. Alternatively, FIG. 4B proposes that the temperature of the recirculated gases 46A be further reduced after diversion and prior to injection by a gas cooler 50 inserted between the diverter 45 and the compressor 12A.

Figure 4B:
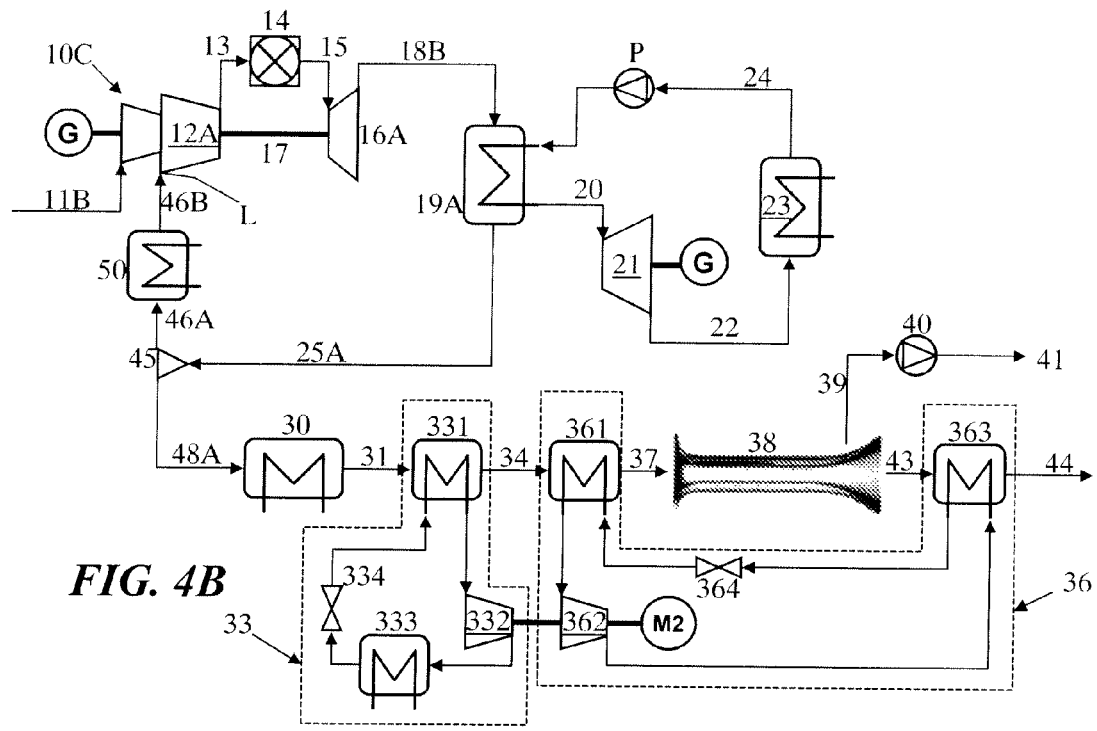
Figure 4C:
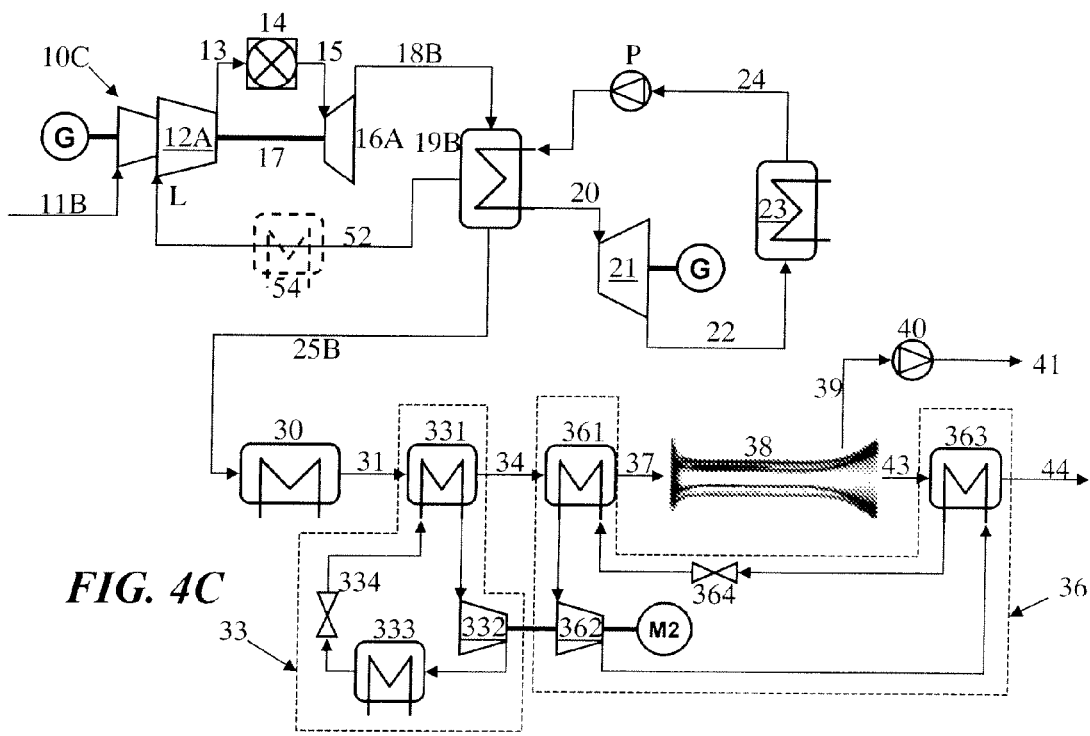

A further variation embodying principles of the invention is shown in FIG. 4C. Here, it is assumed that HRSG 19B incorporates a diverter (not shown) that functions similarly to diverter 45 in FIGS. 3 to 4B to divert a proportion 52 of the flue gases to the location L in the compressor 12A. The first part of the HRSG 19B, between the inlet for flue gases 18B and the HRSG's diverter, may be designed to cool the flue gases 18B to a temperature at least approaching (or perhaps even lower than), the temperature of the compressor air at the location L. However, if it is deemed necessary to attain a flue gas injection temperature that is lower than that attainable by cooling in the first part of the HRSG 19B, the flue gases may be further cooled after diversion by a gas cooler 54 (shown in broken lines) inserted between the diverter in the HRSG and the location L in the compressor 12A. The second part of the HRSG 19B, between the HRSG's diverter and the exit for flue gases 25A, is designed to cool the remaining flue gases 25B to a temperature low enough to enable gas cooler 30 to cool them to a temperature at least approaching ambient.

As is well known, the recirculated gases cannot be injected at only one point in compressor 12A. As a matter of practicality, location L will include a single axial location within the compressor 12A, but will extend around its circumference so that the inflow of recirculated gases is at least approximately evenly distributed around that circumference.

An advantage of the embodiments of FIGS. 4A to C should be noted, in that recirculation of the flue gases to a location L part-way along the compressor 12A reduces its power requirement relative to compressor 12 in FIG. 3. If the mass flow rates out of the compressors 12 and 12A are the same, there will be a reduced compressor inlet flow 11B relative to inlet flow 11A in FIG. 3, so it will be possible to have shorter compressor blades in the stage(s) before the location L at which the recirculated gases are injected. This not only saves material and manufacturing expense, but also reduces compressor rotor blade tip speed, with correspondingly reduced stresses in the blades.

The remaining part of the cooling and $CO_2$ removal process in FIGS. 4A to 4C is as previously described for FIG. 1.

Whereas FIGS. 1 to 4C diagrammatically illustrate a standard type of non-reheated gas turbine engine as part of the combined cycle plant, principles of the present invention would of course also be applicable to combined cycle plants that include reheated gas turbine engines. Such engines have two sequentially arranged combustion stages for greater thermodynamic efficiency, a high pressure turbine being arranged to take some of the energy out of the gases from the first combustion stage before passing the gases to the second combustion stage for reheat.

The present invention has been described above purely by way of example, and modifications can be made within the scope of the invention as claimed. Principles of the present invention also extend to any individual features described or implicit herein or shown or implicit in the drawings or any combination of any such features or any generalisation of any such features or combination, which extends to equivalents thereof. Thus, the breadth and scope of the present invention should not be limited by any of the above-described exemplary embodiments. Each feature disclosed in the specification, including the claims and drawings, may be replaced by alternative features serving the same, equivalent or similar purposes, unless expressly stated otherwise.

Any discussion of the prior art throughout the specification is not an admission that such prior art is widely known or forms part of the common general knowledge in the field.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

LIST OF REFERENCE SYMBOLS

G: generator
M1, M2: electric motors
P: pump
S: discharge flue/stack
10, 10A, 10B, 10C: gas turbine engine
11, 11A, 11B: compressor intake air
12, 12A: compressor of gas turbine engine
13: compressor exit air
14: combustor
15: combustion gases
16, 16A: turbine
17: shaft
18, 18A, 18B: flue gases from turbine
19, 19A, 19B: heat recovery steam generator (HRSG)
20: steam
21: steam turbine
22: wet steam
23: condenser
24: water
25, 25A, 25B: flue gases from HRSG
26: heat exchanger (gas cooler)
27: flue gases from 26

28: flue gas compressor
29: flue gases from 28
30: heat exchanger (gas cooler)
31: flue gases from 30
33: first active cooling cycle/heat pump
331, 361: evaporators
332, 362: refrigerant compressors
333, 363: condensers
334, 364: expansion/metering valves
34: flue gases from 33
36: second active cooling cycle/heat pump
37: flue gases from 36
38: vortex nozzles
39: $CO_2$
40: $CO_2$ compressor
41: $CO_2$ pipeline
43, 44: $CO_2$-depleted flue gases for discharge
45: flow diverter
46, 46A, 46B: recirculated flue gases from 45
47: gas mixer
48, 48A: non-recirculated flue gases from 45
50: heat exchanger/gas cooler
52: recirculated flue gases from flow diverter within HRSG 19B
54: heat exchanger (gas cooler)

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A low carbon emissions combined cycle power plant comprising:
   a gas turbine engine having a turbine exhaust duct, fuelled by carbon-containing fuel, and operable to exhaust carbon dioxide-containing flue gases from the turbine exhaust duct;
   a heat recovery steam generator (HRSG) operable to raise steam by cooling flue gases received from the turbine exhaust duct;
   a steam turbine operable to produce shaft power from steam received from the HRSG;
   a heat exchanger arrangement operable to cool flue gases received from the HRSG down to a temperature approximating normal ambient temperature;
   active cooling apparatus operable to further cool the flue gases down to a temperature range of about −40° C. to −50° C.; and
   a plurality of vortex nozzles, each vortex nozzle having an inlet to receive flue gases from the active cooling apparatus and being operable to cryogenically separate out carbon dioxide from the received flue gases and to emit carbon-dioxide-depleted flue gases;
   wherein the gas turbine engine exhaust duct, the HRSG, the heat exchanger arrangement, and the active cooling apparatus are configured and arranged to operate at a pressure sufficient to assure entry of flue gases to the vortex nozzles at a pressure of at least 2 bar.

2. A plant according to claim 1, further comprising:
   a gas compressor operable to compress separated carbon dioxide received from the vortex nozzles and pump it into a pipeline for conveyance to storage; and
   a discharge flue positioned to receive carbon-dioxide-depleted flue gases from the vortex nozzles and discharge the gases to atmosphere.

3. A plant according to claim 1, wherein the gas turbine engine exhaust duct, the HRSG, the heat exchanger arrangement, and the active cooling apparatus are configured and arranged to operate at a pressure which is sufficient to assure entry of flue gases to the vortex nozzles at a pressure of 2 to 4 bar.

4. A plant according to claim 1, wherein the gas turbine engine comprises a compressor (GT compressor), and further comprising:
   a flow diverter positioned to recirculate a proportion of the flue gases that pass through the HRSG to a location in the GT compressor the pressure at which is substantially the same as the pressure of the recirculated gases.

5. A plant according to claim 4, wherein the flow diverter is configured and arranged to recirculate up to 50% of the gases that pass through the HRSG to the GT compressor.

6. A plant according to claim 4, further comprising:
   means for cooling the flue gases to a temperature that is substantially the same as the GT compressor air temperature at the location in the compressor to which the gases are recirculated.

7. A plant according to claim 6, wherein the means for cooling comprises a gas cooler between the flow diverter and the GT compressor, configured and arranged to cool the diverted flue gases to the temperature for injection into the GT compressor.

8. A plant according to claim 6, wherein the HRSG is configured and arranged to cool the flue gases to the temperature for injection into the GT compressor.

9. A plant according to claim 8, wherein the flow diverter is configured and arranged to divert a proportion of the flue gases directly to the GT compressor before said gases have passed completely through the HRSG.

10. A plant according to claim 6, wherein:
    the flow diverter is configured and arranged to divert a proportion of the flue gases to the GT compressor before said gases have passed completely through the HRSG; and
    the means for cooling comprises a gas cooler between the flow diverter and the GT compressor, configured and arranged to cool the diverted flue gases to the temperature for injection into the GT compressor.

11. A plant according to claim 4, further comprising:
    means for cooling the flue gases to a temperature that is substantially lower than the GT compressor air temperature at the location in the GT compressor to which the gases are recirculated.

12. A plant according to claim 11, wherein the means for cooling comprises a gas cooler between the flow diverter and the GT compressor, configured and arranged to cool the diverted flue gases to the temperature for injection into the GT compressor.

13. A plant according to claim 11, wherein the HRSG is configured and arranged to cool the flue gases to the temperature for injection into the GT compressor.

14. A plant according to claim 11, wherein:
the flow diverter is configured and arranged to divert a proportion of the flue gases to the GT compressor before said gases have passed completely through the HRSG; and
the means for cooling comprises a gas cooler between the flow diverter and the GT compressor configured and arranged to cool the diverted flue gases to the temperature for injection into the GT compressor.

15. A plant according to claim 1, wherein:
the gas turbine engine comprises at least one turbine stage less than a pre-existing engine having a plurality of turbine stages and operative with a pressure in the turbine exhaust duct of approximately 1 bar; and
the gas turbine engine is operative with a pressure in the turbine exhaust that is the required inlet pressure of the vortex nozzle plus the pressure losses of portions of the plant fluidly between the gas turbine engine and the vortex nozzles.

16. A process for obtaining low carbon emissions from a combined cycle power plant that includes a gas turbine engine fuelled by carbon-containing fuel and operable to exhaust carbon dioxide-containing flue gases of the gas turbine, a heat recovery steam generator (HRSG) operable to raise steam by cooling flue gases received from the turbine exhaust duct, a steam turbine operable to produce shaft power from steam received from the HRSG, a heat exchanger arrangement operable to cool flue gases received from the HRSG down to a temperature approximating normal ambient temperature, and active cooling apparatus operable to further cool the flue gases down to a temperature range of about −40° C. to −50° C., the process comprising:
first cooling gas turbine flue gases by using them in the HRSG to raise steam to drive the steam turbine to produce shaft power;
second further cooling said flue gases to a temperature about normal ambient temperature in the heat exchanger;
third further cooling said flue gases to a temperature range of about −40° C. to −50° C. in the active cooling apparatus; and
cryogenically separating carbon dioxide from the flue gases in a plurality of vortex nozzles and emitting carbon-dioxide-depleted flue gases;
wherein exhausting flue gases from the gas turbine engine and said third further cooling of the flue gases step occurs at a pressure which is sufficient to assure entry to the plurality of vortex nozzles at a pressure of at least 2 bar.

17. A process according to claim 16, further comprising:
compressing separated carbon dioxide for storage; and
in parallel with said compressing, discharging carbon-dioxide-depleted flue gases to atmosphere.

18. A process according to claim 16, wherein the inlet pressure to the vortex nozzle is in the range of 2 to 4 bar.

19. A process according to claim 16, wherein the gas turbine engine comprises a compressor (GT compressor), and further comprising:
diverting a proportion of the flue gases from said first cooling step before said proportion of flue gases is acted upon by said second cooling step; and
recirculating and injecting said proportion of flue gases into the GT compressor at a location in the GT compressor the pressure at which is substantially the same as the pressure of the recirculated flue gases.

20. A process according to claim 19, wherein diverting comprises diverting up to 50% of the gases from said first cooling step.

21. A process according to claim 19, further comprising:
subsequently cooling said recirculated flue gases to a temperature that is substantially the same as the GT compressor air temperature at the location in the GT compressor to which the gases are recirculated.

22. A process according to claim 21, wherein said first cooling step comprises cooling the flue gases to the temperature for recirculation to the GT compressor.

23. A process according to claim 21, wherein said first cooling step and said subsequently cooling said recirculated flue gases step cool the flue gases to the temperature for recirculation to the GT compressor.

24. A process according to claim 23, wherein said subsequently cooling step occurs before said diverting.

25. A process according to claim 23, wherein said subsequently cooling step occurs between said diverting and said injecting.

26. A process according to claim 25, wherein said diverting occurs part-way through said first cooling.

27. A process according to claim 19, further comprising:
subsequently cooling said recirculated flue gases to a temperature that is substantially lower than the GT compressor air temperature at the location in the GT compressor to which the gases are recirculated.

28. A process according to claim 27, wherein said first cooling step comprises cooling the flue gases to the temperature for recirculation to the GT compressor.

29. A process according to claim 27, wherein said first cooling step and said subsequently cooling said recirculated flue gases step cool the flue gases to the temperature for recirculation to the GT compressor.

30. A process according to claim 29, wherein said subsequently cooling step occurs before said diverting.

31. A process of operating a low-carbon-emissions combined cycle power plant, the plant having a gas turbine engine part fuelled by carbon-containing fuel and operable to exhaust carbon dioxide-containing flue gases of the gas turbine, a heat recovery steam generator (HRSG) operable to raise steam by cooling flue gases received from the turbine exhaust duct, a steam turbine operable to produce shaft power from steam received from the HRSG, a heat exchanger arrangement operable to cool flue gases received from the HRSG down to a temperature approximating normal ambient temperature, active cooling apparatus operable to further cool the flue gases down to a temperature range of about −40° C. to −50° C., a plurality of vortex nozzles to separate out carbon dioxide from flue gases at cryogenic temperatures, and parts of the plant fluidly connected between the gas turbine engine and the vortex nozzles, the process comprising:
operating said gas turbine engine part with a turbine exhaust pressure and pressure of said parts at a pressure which is sufficient to assure an inlet pressure to the plurality of vortex nozzles of at least 2 bar.

\* \* \* \* \*